United States Patent [19]

Rejeski et al.

[11] 3,950,213

[45] Apr. 13, 1976

[54] MACHINE FOR MANUFACTURING INSULATED DUCT

[75] Inventors: William E. Rejeski; Norman J. Perusse, both of Farmington, Conn.

[73] Assignee: The Wiremold Company, West Hartford, Conn.

[22] Filed: Nov. 7, 1974

[21] Appl. No.: 521,657

[52] U.S. Cl. ............... 156/461; 156/144; 156/203; 156/468
[51] Int. Cl.² ....................................... B29D 23/10
[58] Field of Search ................. 156/443, 461–466, 156/200–203, 218, 62.2, 62.6, 353, 522, 191, 193, 143, 144; 53/44–46, 373; 93/80, 82, 94 E; 29/473.9, 474.1

[56] References Cited
UNITED STATES PATENTS

| | | | |
|---|---|---|---|
| 2,697,473 | 12/1954 | Techtmann | 156/443 X |
| 2,906,317 | 9/1959 | Keyes | 156/218 X |
| 3,220,320 | 11/1965 | Brigham | 93/80 |
| 3,528,159 | 9/1970 | Miles | 93/80 X |
| 3,627,615 | 12/1971 | Guiles et al. | 156/466 |
| 3,816,043 | 6/1974 | Snelling | 425/112 X |

*Primary Examiner*—William A. Powell
*Assistant Examiner*—David A. Simmons
*Attorney, Agent, or Firm*—Prutzman, Hayes, Kalb & Chilton

[57] ABSTRACT

A machine is provided for making flexible tubular insulated duct having multiple wraps formed about a compressible inside core. A sheet forming collar shapes the wraps about the core upstream of a joint sealer which cooperates with an underlying conveyor to draw the core and wrap materials along a linear path of movement through the joint sealer to form a longitudinally extending joint on the outermost wrap of the duct. A second conveyor overlies the first conveyor downstream of the joint sealer, and the second conveyor and the joint sealer are selectively adjustable in height to form duct of selected diameter size and to apply a desired tractive force to the sealed duct. A cutting unit is selectively operable downstream of the second conveyor for cutting the duct into predetermined lengths.

14 Claims, 8 Drawing Figures

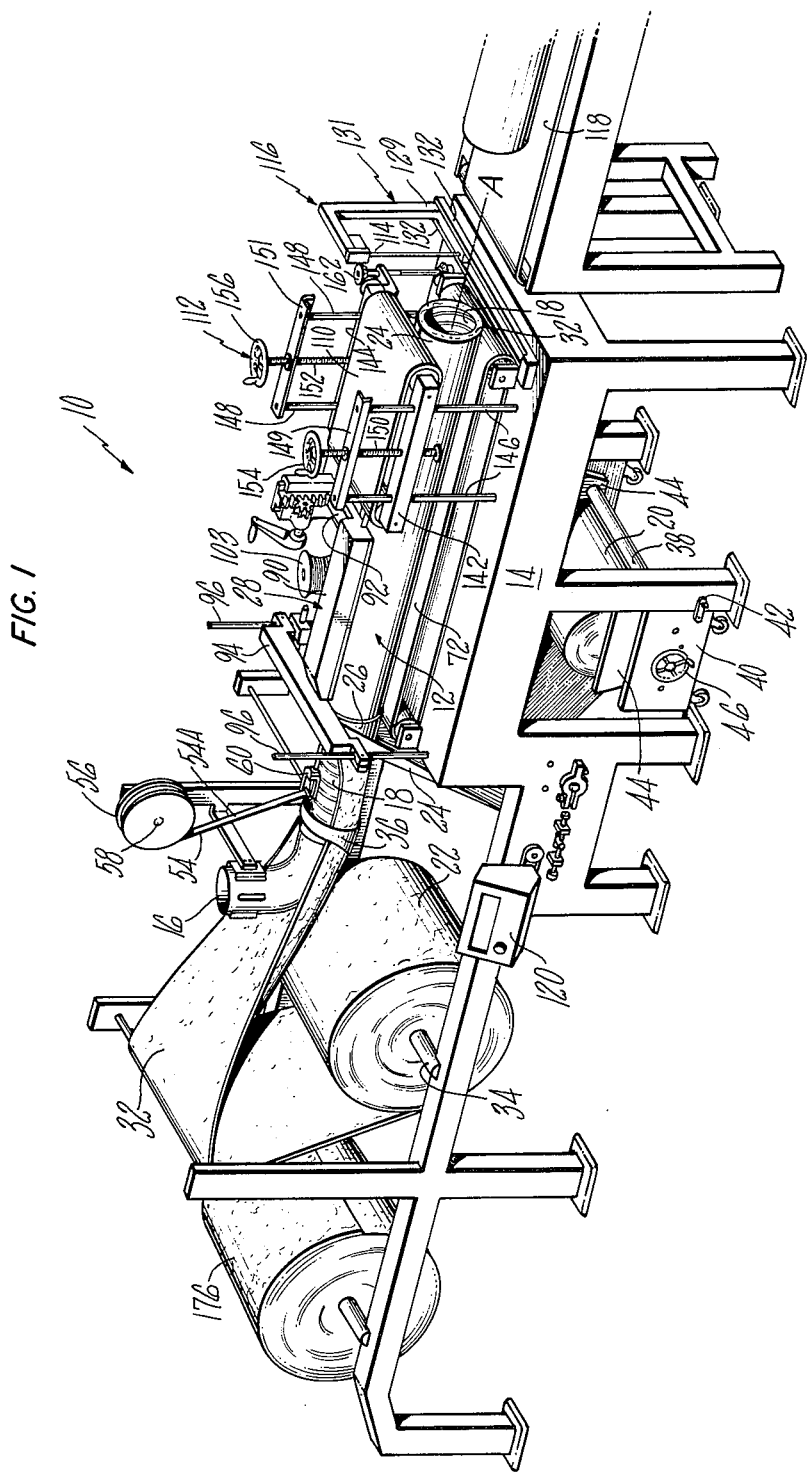

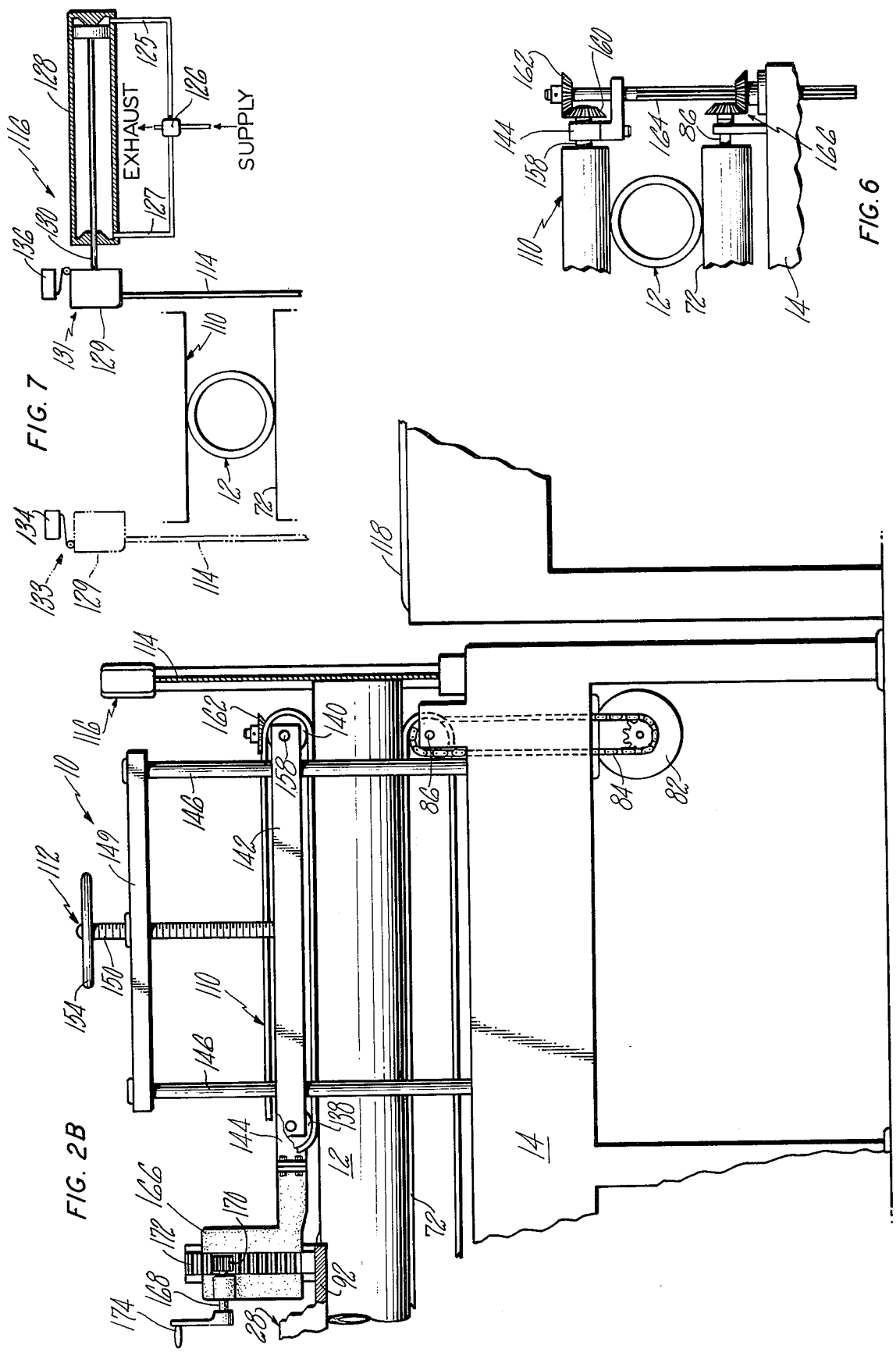

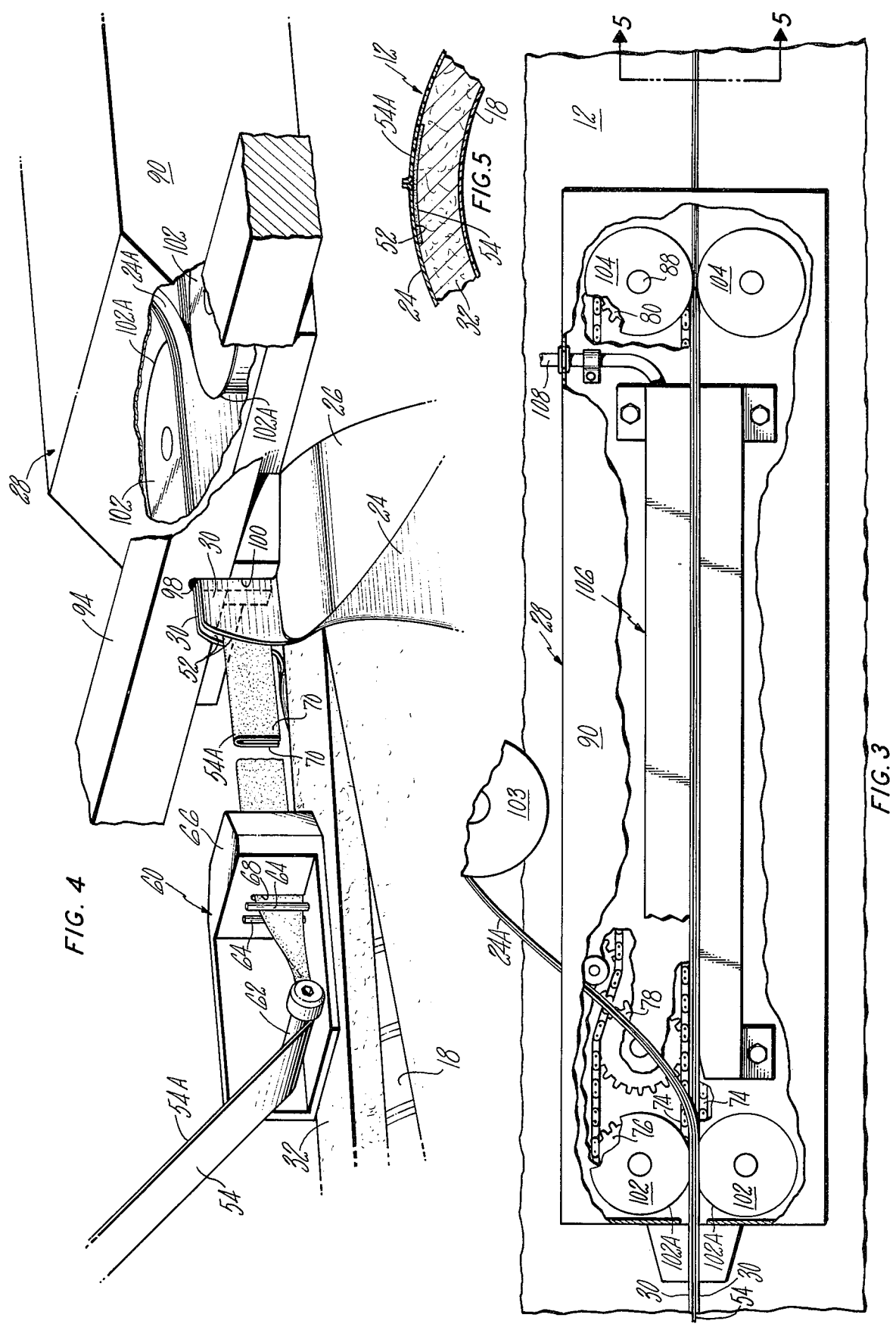

MACHINE FOR MANUFACTURING INSULATED DUCT

This invention generally relates to machines for manufacturing duct and particularly concerns a machine which makes flexible insulating duct with concentric wraps of different materials having a continuous longitudinally extending seam or joint sealing the outer wrap.

A primary object of this invention is to provide a new and improved machine particularly suited to form an insulating tubular duct in a relatively high speed production operation wherein predetermined lengths of duct are formed from multiple layers of flat sheet material with a continuous longitudinal joint on an outer casing of the duct.

Another object is to provide such a machine which is quick and easy to set up for making duct of selected circumferential sizes and which is designed for high production output with minimum service requirements.

A further object is to provide a new and improved machine for making an insulating duct having an outer tubular casing with a continuous longitudinally extending joint formed on an inside surface of the casing.

Still another object is to provide a machine of the above described type which is of significantly simplified construction and which has no need for complex mechanical components or controls normally associated with conventional insulating duct making machines.

Other objects will be in part obvious and in part pointed out more in detail hereinafter.

A better understanding of this invention will be obtained from the following detailed description and the accompanying drawings of an illustrative application of this invention.

In the drawings:

FIG. 1 is an isometric view schematically showing a machine incorporating this invention;

FIG. 2B is an enlarged schematic side elevational view, partly in section and partly broken away, of a downstream portion of the machine of FIG. 1;

FIG. 3 is an enlarged plan view, partly in section and partly broken away, showing a heat sealer unit of the machine of FIG. 1;

FIG. 4 is an enlarged isometric view, partly in section and partly broken away, showing a tape reversing unit in upstream relation to the heat sealer unit of FIG. 3;

FIG. 5 is a partial cross sectional view taken generally along line 5—5 of FIG. 3 showing the duct made by the machine of FIG. 1;

FIG. 6 is an elevational end view, partly broken away, showing a drive connection to a conveyor section of the machine of FIG. 1; and FIG. 7 is an elevational end view, partly broken away and partly in section, of a cutting unit of the machine of FIG. 1.

Figure 2A:
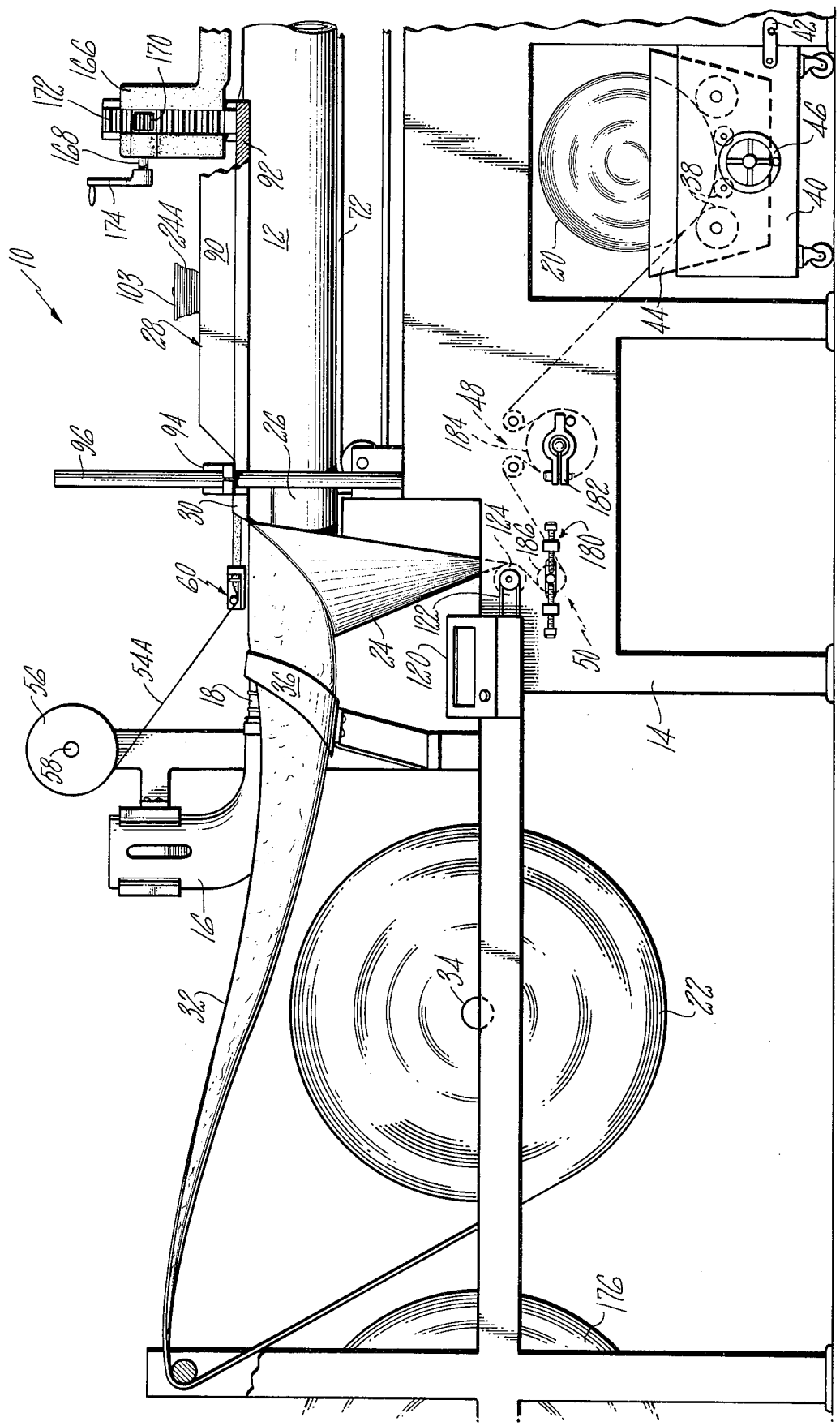
FIG. 2A is an enlarged schematic side elevational view, partly in section and partly broken away, of an upstream portion of the machine of FIG. 1.

Referring to the drawings in detail, a machine 10 for making insulating duct 12 is illustrated having a frame 14 supporting a loading tube 16 for a tubular central core 18 and also supporting rolls 20 and 22 of flat sheet materials to be circumferentially wrapped and sealed about the central core 18 to form flexible insulating duct 12 in tubular form.

Polyester film, or other suitable imperforate thin sheet material providing an outside vapor barrier casing 24 is drawn by machine 10 from the roll 20 directly about a sheet forming collar or so-called "sailor's" collar 26 adjacent a heat sealer unit 28. The sailor's collar 26 is shaped in the form of a truncated cylinder disposed with its base in a vertical plane and its shortest wall in an uppermost position. This collar 26 acts to continuously form the casing 24 into a cylindrical configuration as the casing 24 is drawn over the outside surface of the collar 26 and then inverted over the lip of the sailor's collar 26 as the film 24 is drawn along the inside surface of collar 26. The shortest wall along the upper surface of collar 26 is split to permit an upper joint to be formed by opposed longitudinally extending free edges 30, 30 of the casing 24 formed in upwardly directed confronting relation to each other (FIG. 4). The collar 26 may be removably secured in position to a leading end of the heat sealer 28.

The specifically illustrated embodiment of this invention also shows insulating material in the form of a thick resilient mat of fiber glass wool or other suitable insulation 32 stored on a supply roll 22 having a shaft 34 supported on frame 14. Insulation 32 is drawn through a second sheet forming station or so-called "horse's" collar 36 coaxially aligned upstream of the first sheet forming collar or sailor's collar 26. As the insulation 32 passes through horse's collar 36, insulation 32 is formed into a configuration having a generally U-shaped cross-section before entry into the collar 26 where the insulation is further shaped into a completely cylindrical wrap about the tubular core 18 before emerging from sailor's collar 26 surrounded by casing 24 which is also shaped by the collar 26 into tubular form about insulation 32.

The width of sheet insulation 32 is slightly greater than its outside circumference as the insulation 32 emerges in tubular form from the sailor's collar 26. This construction permits opposite longitudinal edges of the sheet to be overlapped somewhat and angularly offset from the uppermost part of the surrounding casing 24 where its mating edges meet.

The loading tube 16 shown in FIG. 1 has a vertical inlet section connected by an arcuate elbow section to a horizontally extending outlet section coaxially aligned with collars 36 and 26. A discharge end of cartridge loading tube 16 is accordingly located to readily dispense core 18 onto insulation 32 such that insulation 32 and core 18 are fed in synchronism through forming collars 36 and 26 to concentrically wrap insulation 32 and casing 24 about core 18 to form tubular duct 12. The central core 18 preferably includes spring wire formed into a helical coil having a tough thin plastic film or fabric cover. The core 18 thus provides an inner reinforcement for insulation 32, and the core 18 will be understood to be axially compressible and of a resilient nature due to its spring wire construction.

Casing 24 is drawn from roll 20 supported for rotation on a plurality of rollers such as at 38 mounted in a movable carriage 40. The carriage 40 is shown secured in desired fixed position relative to the machine frame 14 by latch 42. Locating plates such as at 44 are engageable with opposite sides of the roll 20 for centering it for proper alignment relative to the machine 10 depending on the width of the roll 20 and, thereby, the circumference of the duct 12 to be formed. A hand wheel 46 is shown in the drawings which will be understood to control the positioning of the locating plates 44 for centering the roll 20. The flat sheet of casing 24 is trained over a plurality of rollers such as at 48 and 50 mounted on the frame 14, and is initially manually fed during machine set up over the rearwardly opening peripheral edge of the sailor's collar 26 with opposed radially outwardly directed free edges 30, 30 of casing 24 in confronting relation to one another on the uppermost part of the tubular duct 12 being formed to extend through the slotted opening at the top of the collar 26.

The machine of this invention is particularly suited to form a continuous longitudinally extending uppermost joint along the length of the duct 12 with the joint formed on an inside surface 52 of the casing 24. The specific form of joint made by machine 10 is illustrated in FIG. 5 and is also fully described and illustrated in U.S. patent application Ser. No. 515 055 of William E. Rejeski, filed Oct. 15, 1974, entitled "Method of Forming a Tubular Joint and the Product Formed Thereby" assigned to the assignee of this invention, the subject matter of which application is incorporated herein by reference. The Rejeski application clearly details the specific construction and advantages of the joint which as described is formed by fixing a strip of flexible connector tape 54 to the opposed free edges 30, 30 of casing 24 to join its inside surfaces 52, 52 in edge-to-edge abutment. Inside edge surfaces of casing 24 preferably have a heat sealable coating of uncured neoprene or other suitable conventional material, and the tape 54 may be formed of a flat tough fiber glass strip with a heat sealable coating on one side 5AA of essentially the same composition as the casing coating.

Tape 54 is fed from a roll 56 supported on a shaft 58 mounted on machine frame 14 and is fed through a tape reversing unit 60 (best seen in FIGS. 2 and 4) to be interposed between free edges 30, 30 of casing 24. Tape 54 is trained under a roller 62 and fed in folded condition, which in cross section appears as an inverted "V" shape, between a pair of spaced guide pins 64, 64 vertically mounted in a guide block 66. Guide block 66 will be understood to be fixed to frame 14 and is shown having a slot 68 extending through an output end of the block 66 along the feed path of the material to extend between the upper free edges 30, 30 of casing 24. Connecting tape 54 thus is formed into a pair of interconnected leg flaps 70 and 70 with the heat sealable coating on the outside of the tape 54 and confronting the coated free edges 30,30 of casing 24 with the tape leg flaps 70, 70 extending downwardly in a direction opposite to the free edges 30, 30 of casing 24 which project vertically upwardly in spaced parallel relation for entry into heat sealer unit 28.

Free edges 30, 30 of casing 24 are properly aligned relative to one another and to the tape 54 during machine set up. The different duct materials are concentrically disposed about an axis of movement "A" extending along the feed path of the materials at the second forming collar 26 immediately adjacent heat sealer unit 28. By virtue of this construction, the composite duct materials are not all required to be supported for movement on thin film casing 24. Undesired turning moments acting on upstanding free edges 30, 30 of casing 24 are accordingly minimized, and effectively controlled transport of duct 12 is obtained by a combined drive of the heat sealer 28 and an underlying conveyor 72 downstream of the sailor's collar 26.

More specifically, heat sealer 28 features two opposed so-called silent conveyor drive chains 74, 74 which extend the length of the heat sealer 28 and are trained over sprockets such as at 76, 78 and 80 supported on frame 14 for rotation about vertical axes. The chains 74, 74 ride against the upwardly projecting free edges 30, 30 of casing 24, perferably below the tape 54, and compressively engage free edges 30, 30 of casing 24 and co-act with conveyor 72 to drive duct 12 through the heat sealer 28 while drawing off the duct casing 24, insulation 32 and core 18 from their respective supply rolls 20, 22 and loading tube 16. A suitable motor is shown for operating a chain 84 which will be understood to drive the shaft 86 of conveyor 72; shaft 88 of heat sealer 28 (FIG. 3) is driven by any well known drive connection, not shown, to the motor 82 whereby meshing sprockets such as at 80 are power operated to drive silent chains 774, 74.

Heat sealer 28 is a conventional unit fully illustrated and described in U.S. Pat. No. 2,697,473 issued Dec. 21, 1954 in the name of H. F. Techtman and entitled "Rotary Heat Sealer". It will be sufficient for an understanding of this invention to state that heat sealer 28 is contained within a box frame 90 having a support platform 92 mounted for vertical adjustment toward and away from underlying conveyor 72.

As best seen in FIGS. 1, 3, and 4, a laterally extending cross bar 94 supports one end of heat sealer 28; the cross bar 94 is mounted for sliding movement on a pair of vertical guide rods 96, 96 fixed to frame 14 whereby heat sealer 28 and its integral underlying support platform 92 (FIG. 2A) are supported for vertical adjustment. Cross bar 94 and heat sealer 28 have aligned central channels 98, 100 (FIG. 4) which in turn are axially aligned with slot 68 in tape reversing guide block 66 for receiving and guiding free edges 30, 30 of casing 24 and tape 54. To virtually eliminate any need whatsoever for fine adjustment and precise height alignment of free edges 30, 30, the material of casing 24 is sufficiently wide to permit overlap of casing edges 30, 30 above tape 54 with the machine 10 providing for excess casing to be trimmed downstream of collar 26 between a pair of trimming rolls 102, 102. Trimming rolls 102, 102 are driven by associated sprockets 76, 76 engaging the silent drive chains 74, 74 and have complementary peripheral upper knifelike cutting edges 102A, 102A to cut excess casing material 24A extending above tape 54. If desired, a capstan 103 may be provided with any suitable drive, not shown, to rotate in timed relation to conveyor 72 to act as a take-up reel for removing the trimmed casing. The free edges 30, 30 and tape 54 interposed there between thus are clamped, propelled and guided by the silent drive chains 74, 74 along the length of the heat sealer 28, and the underlying conveyor 72 supports and assists in moving the duct in timed relation to the silent chains 74, 74 for delivering duct 12 along its feed path to downstream pressure or sealing rolls 104, 104 which engage the free edges 30, 30 which overlie the tape 54 interposed therebetween and seal the joint formed by the heat sealer 28. Accordingly, it will be understood that the cutting edges 102A, 102A of trimming rolls 102, 102 are disposed in symmetrical raised relation to the downstream sealing rolls 104, 104.

The above described materials are normally manually manipulated for feeding along their respective paths during machine set up, at least to the extent of passing the edges 30, 30 of the casing 24 and interposed tape 54 through the heat sealer unit 28.

The heat sealer 28 preferably includes a preheater such as at 106 having a heating element, not shown, connected to a source of power by electrical wiring 108. The sealing rolls 104, 104 preferably contain heating elements as fully described in U.S. Pat. No. 2,697,473 whereby the projecting free edges 30, 30 with their heat sealable coatings extending above silent chains 74, 74 are sealed to the outside coated leg flaps 70, 70 of the tape 54 by heat and pressure applied by the sealing rolls 104, 104 it being understood that the silent chains 74, 74 are positioned to drivingly engage edge flaps 30, 30 of casing 24 below the tape 54, and it will be seen that the driven sealing rolls 104, 104 provide an additional drive to draw the duct 12 through the machine 10.

In accordance with yet another feature of this invention, the central core 18 is manually loaded in the form of compressed cartridges which, when fully extended, are of predetermined length such as, say, 25 feet. The cartridges are manually inserted into the inlet section of the cartridge loading tube 16, and the leading end of each core 18 is extended to be fed through a discharge end of tube 16 in a controlled manner onto insulation 32 immediately upstream of its forming collar 36 as fully described and illustrated in U.S. patent application Ser. No. 523,213 of Norman Perusse, entitled "Apparatus for Feeding Core Material" and assigned to the assignee of this invention, the subject matter of which is incorporated herein by reference. By such provision of the described cartridge loading tube 16, predetermined lengths of central core duct material 18 are conveniently supplied, are quick and easy to handle in their compressed compact state, and are discharged in sequence through the cartridge loading tube 16 in a fully extended length to not only provide support for the outer wraps of casing 24 and insulation 32 to be wrapped about the core 18, but to additionally serve as an impervious vapor barrier if the covering for the helical spring wire of the core 18 is a thin film imperforate plastic, e.g., or other suitable imperforate material.

As the duct 12 with its sealed longitudinal joint emerges from the heat sealer 28 under the combined propelling effects of the conveyor 72 and silent drive chains 74, 74, the duct 12 enters a second conveyor section of machine 10 which features a vertically adjustable upper conveyor 110 disposed in overlying parallel relation to lower conveyor 72. Upper conveyor 110 is located immediately downstream of the heat sealer 28 but is of shorter length than lower conveyor 72; the terminal ends of both upper and lower conveyors 110, 72 being substantially in vertical alignment with one another.

To apply a selected tractive force to the finished, sealed composite duct 12 as it emerges from the heat sealer 28, suitable lead screw adjustment such as at 112, 112 may be provided to manually adjust the height of upper conveyor 110 relative to lower conveyor 72, depending on the size duct being formed. Upper conveyor 110 acts jointly with lower conveyor 72 to provide continuous uniform control over duct 12 emerging from heat sealer 28 and to feed duct 12 past a saw 114 of a downstream cutting unit 116 onto yet another power operated conveyor 118 positioned downstream of cutting unit 116, the conveyor 118 being aligned with lower conveyor 72 at a corresponding level to smoothly receive duct 12 as it moves past cutting unit 116.

By virtue of the above described construction, a continuous in-line arrangement of operative components is provided for forming preselected lengths of finished composite duct in a high production operation, whereby the insulation 32 and casing 24 may be cut between sections of core 18 of predetermined length to form duct 12 of a selected length. After a specified length of duct 12 has emerged from the sealer 28, the saw 114 of cutting unit 116 is operated to cut the duct 12 into predetermined lengths responsive to a signal from a conventional presettable two stage predetermining electronic counter 120 having a drive connection 122 to an input wheel 124 engaging the casing 24 to sense the linear feet of duct 12 being driven past the cutting unit 116 and to provide a signal to a control system, not shown. The control system de-energizes the motor 82, stopping the conveyors 72, 110 and capstan 103, energizes the saw 114 and actuates a solenoid operated control valve 126 to supply air to an air cylinder 128 through line 125 and connect line 127 to exhaust (FIG. 7). This action extends piston rod 130 of air cylinder 128 to drive saw carriage 129 along guide rails 132, 132 (FIG. 1) laterally across the path of movement "A" of the duct 12 toward a fully extended position 133 of the saw 114 wherein the duct 12 is completely severed. The counter 120 is preset in accordance with the known length of fully extended core 18 to provide a signal to effect such a cutting operation upon passage of each length of core 18 past the cutting unit 116 with the next following length of core 18 adjacent but upstream of the saw 114. Thus, the saw 114 slices the duct insulation 32 and casing 24 between adjacent lengths of core 18 with a predetermined spacing between the lengths of core 18 providing a limited overlapping of insulation 32 and casing 24 beyond the ends of each core length.

After the duct 12 is severed, the saw 114 is in fully extended position 133 (FIG. 7) wherein carriage 129 engages a microswitch 134 which actuates the solenoid control valve 126 to switch the supply and exhaust connections to the air cylinder 128. This action supplies air to the rod end of the air cylinder 128 to return the saw 114 into its retracted starting position 131. The return of saw 114 causes carriage 129 to engage microswitch 136 providing a signal to the control system which de-energizes the saw 114 and energizes the motor 82 to again operate capstan 103 and the conveyors 72, 110 to feed duct 12 until the next predetermined signal to the control system is generated by the counter 120. The next signal from the counter 120 indicates that a trailing end of core 18 has been discharged from the loading tube 16, and this condition is sensed by the counter 120 after a predetermined length of duct 12 has passed the cutting unit 116 to again stop the conveyors 72 and 110. With the machine stopped, the next core cartridge is then manually loaded into the tube 16 for discharge with a desired spacing established between adjacent lengths of core 18 to ensure severance of duct 12 between successive lengths of core 18. Upon re-energizing the conveyors 72 and 110 through the control system, duct 12 is conveyed from heat sealer 28 to cutting unit 116 and the cycle is repeated.

This invention also contemplates quick and easy adjustment of machine 10 for accommodating duct sizes of different diameters. Upper conveyor 110 is operatively mounted on rollers 138, 140 supported for rotation about horizontal axes in side rails 142, 144 movable on upright guide rods 146, 146 and 148, 148 fixed to machine frame 14. Side rails 142, 144 are each shown having a lead screw 150, 152 mounted on its respective side rail and threadably connected to an overlying support rail 149, 151 fixed to the upright guide rails 146, 146 and 148, 148 for driving each side rail toward and away from its respective support rail. A sprocket, not shown, is preferably mounted on each lead screw and interconnected by a drive chain, not shown, to ensure that opposite sides of conveyor 110 are simultaneously lifted or lowered in unison upon adjusting only one hand wheel 154, 156 to provide uniform height adjustment of conveyor 110 depending on the size duct being formed.

To ensure that upper conveyor 110 is driven in synchronism with lower conveyor 72, the height adjustment of upper conveyor 110 is provided without disturbing its drive connection to drive chain 84. As best seen in FIG. 6, a drive shaft 158 carries a bevel gear 160 driven by a complimentary bevel gear 162 fixed to an upright splined drive shaft 164 having a bevel gear drive connection at 166 to drive shaft 86 of the lower conveyor 72 which is driven by chain 84 from motor 82. This illustrated splined shaft and bevel gear drive arrangement permits the upper conveyor 110 and its drive to be adjusted relative to the lower conveyor 72 and its drive by raising or lowering the supporting side rails 142, 144 while continuously maintaining the drive connection to both the upper and lower conveyors 110, 72 from the motor 82.

Height adjustment of upper conveyor 110 also provides for simultaneous adjustment of the heat sealer 28 since its support platform 92 is connected to side rail 144. As best seen in FIG. 2B, the side rail 144 has an integrally formed extension with an upright lift stand 166. The lift stand 166 supports drive shaft 168 having a pinion 170 in meshing engagement with a vertically extending rack 172 mounted on the heat sealer support platform 92. A hand crank 174 is fixed to drive shaft 168 for raising and lowering the platform 92, and thus the heat sealer 28, relative to its lift stand 166 and the interconnected upper conveyor 110. As fully described in the referenced U.S. Pat. No. 2,697,473, a pawl, not shown, ratchets over the pinion teeth when raising the platform 92 and provides a disengageable latch for securing the platform 92 in adjusted position. The above described arrangement thus provides for fine adjustment of the heat sealer 28, as desired, after the initial height adjustment of the upper conveyor 110 and heat sealer 28.

From the foregoing description, it will be seen that insulating duct 12 of predetermined length may be continuously formed in a quick and easy manufacturing operation. The heat sealer 28 and upper conveyor sections 110 may be manually adjusted for duct of different diameters; the forming collars 26 and 36 and cartridge loading tube 16 may be modular units interchangeable with similar units of different diameter to accommodate different size insulation, casing and core materials. Insulation roll 22 may be readily interchangeable with rolls of different width such as backup roll 176 for a selected diameter; the vapor barrier roll 20 likewise is replaceable with a roll of different diameter for a duct of a desired finished diameter size. Suitable tension adjustment may be provided on vapor barrier casing 24 fed to collar 26 by a conventional adjustable brake arm arrangement 182 for selectively adjusting the tension of the casing 24 trained over the roll under full speed operating conditions. The adjacent roll 186 is also desirably adjustable in its location on the frame 14 by a slide locating device 188 for obtaining an optimum transition angle of casing 24 being fed to the forming collar 26.

As will be apparent to persons skilled in the art, various modifications, adaptations and variations of the foregoing specific disclosure can be made without departing from the teachings of this invention.

We claim:

1. A machine for making tubular duct with a supporting core surrounded by insulation and an outer casing to be wrapped about the insulation with opposite edges of the casing projecting radially outwardly in confronting relation to one another to be sealed into a longitudinally extending joint, the machine comprising a first power operated conveyor for supporting and conveying duct along a linear path of movement, a tape reversing unit for receiving and forming a connecting tape into a pair of interconnected leg flaps for receipt between the opposite edges of the casing in confronting relation thereto, a joint sealer downstream of the tape reversing unit, the joint sealer having a pair of opposed downstream sealing rolls and a pair of opposed drive conveyors upstream of the sealing rolls, the drive conveyors of the joint sealer overlying the first conveyor for clamping and driving the projecting casing edges and the connecting tape from the tape reversing unit to the sealing rolls, the drive conveyors of the joint sealer cooperating with the underlying first conveyor to guide and advance the casing along its path of movement with the tape interposed in clamped relation between its opposite edges.

2. The machine of claim 1 further including a frame, a second power conveyor cooperating with the first conveyor and overlying the same in parallel relation thereto downstream of the joint sealer, the first and second conveyors being endless belt conveyors with the second belt conveyor mounted on the frame for selectively adjusting its height relative to the first conveyor.

3. The machine of claim 2 wherein the joint sealer is interconnected to the second belt conveyor for adjustable height positioning relative to the underlying first conveyor simultaneously with adjustment of the second conveyor for duct of different diameter sizes.

4. The machine of claim 1 wherein a cutting unit is mounted downstream of the first conveyor for cutting sealed duct into predetermined lengths.

5. A machine for making tubular duct having a supporting core surrounded by insulation and an outer casing wrapped about the insulation, the machine comprising a first power operated conveyor for supporting and conveying duct along a linear path of movement, a sheet forming collar upstream of the first conveyor for receiving tubular core and shaping sheets of indefinite lengths of casing and insulation into tubular form about the core with opposite edges of the casing projecting radially outwardly in confrontiing relation to one another to be sealed into a longitudinally extending joint, a joint sealer having a pair of opposed downstream sealing rolls and a pair of opposed drive conveyors upstream of the sealing rolls, the drive conveyors of the joint sealer overlying the first conveyor for clamping and driving the projecting casing edges from the forming collar to the sealing rolls, the drive conveyors of the joint sealer cooperating with the underlying first conveyor to guide and advance the casing along its path of movement, a second power operated conveyor overlying the first conveyor in parallel relation thereto downstream of the joint sealer, the second conveyor cooperating with the first conveyor for applying a tractive force to sealed duct emerging from the joint sealer to draw the sealed duct along its path of movement, a cutting unit downstream of the second conveyor for cutting sealed duct into predetermined lengths, the core being formed of compressible resilient material and being supplied to the machine in the form of a compressed tubular cartridge having a predetermined core length when fully extended, and a cartridge loading tube for receiving such compressed core cartridges, the cartridge loading tube having a discharge end coaxially aligned with and upstream of the forming collar for guiding and discharging core in fully extended condition onto the insulation to be shaped into tubular form about the core.

6. The machine of claim 5 further including a second sheet forming collar disposed in coaxial upstream relation to the first forming collar, the second forming collar serving to guide and shape the insulation into a form of generally U-shaped cross section upstream of the first forming collar prior to the insulation being shaped into tubular form about the core and within the casing by the first forming collar.

7. The machine of claim 6 wherein the discharge end of the cartridge loading tube is located immediately upstream of the second sheet forming collar and in coaxial alignment with the first and second sheet forming collars.

8. A machine for making tubular duct having a supporting core surrounded by insulation and an outer casing wrapped about the insulation, the machine comprising a first power operated conveyor for supporting and conveying duct along a linear path of movement, a sheet forming collar upstream of the first conveyor for receiving tubular core and shaping sheets of indefinite lengths of casing and insulation into tubular form about the core with opposite edges of the casing projecting radially outwardly in confronting relation to one another to be sealed into a longitudinally extending joint, a joint sealer having a pair of opposed downstream sealing rolls and a pair of opposed drive conveyors upstream of the sealing rolls, the drive conveyors of the joint sealer overlying the first conveyor for clamping and driving the projecting casing edges from the forming collar to the sealing rolls, the drive conveyors of the joint sealer cooperating with the underlying first conveyor to guide and advance the casing along its path of movement, a second power operated conveyor overlying the first conveyor in parallel relation thereto downstream of the joint sealer, the second conveyor cooperating with the first conveyor for applying a tractive force to sealed duct emerging from the joint sealer to draw the sealed duct along its path of movement, a cutting unit downstream of the second conveyor for cutting sealed duct into predetermined lengths, a tape supply unit for supplying a joint connecting tape, a tape folding device for receiving tape from the tape supply unit and folding the tape lengthwise to provide a pair of leg flaps to be drawn by the sealing rolls between edges of the casing, the leg flaps of the tape projecting from its fold in a radially inward direction opposite to the free edges of the casing for sealing the casing with a longitudinally extending joint on an inside surface of the casing.

9. The machine of claim 8 wherein a heat sealable adhesive is provided on at least one of the confronting leg flap and casing free edge surfaces, and wherein the joint sealer includes heating means for melting the heat sealable adhesive to secure the confronting tape and casing edges to form the joint upon passage through the joint sealer and its sealing rolls.

10. The machine of claim 8 further including a pair of opposed trimming rolls intermediate the sheet forming collar and sealing rolls, the trimming rolls having complementary cutting edges, the trimming rolls being in symmetrical alignment with the sealing rolls with said cutting edges in raised relation thereto for trimming excess casing extending above the tape fold upon the sealing rolls drawing the tape and free edges of the casing through the joint sealer.

11. The machine of claim 10 wherein the drive conveyors of the joint sealer are engageable with the casing in underlying relation to the folded tape interposed between the free edges of the casing for clamping the casing therebetween and transmitting movement to the duct in timed relation to the movement imparted thereto by the underlying first conveyor, and wherein the sealing rolls are engageable with the casing edges which are in coextensive alignment with the tape interposed between the casing edges for applying pressure thereto to form the joint.

12. A machine for making tubular duct having a supporting core surrounded by insulation and an outer casing wrapped about the insulation, the machine comprising a first power operated conveyor for supporting and conveying duct along a linear path of movement, a sheet forming collar upstream of the first conveyor for receiving tubular core and shaping sheets of indefinite lengths of casing and insulation into tubular form about the core with opposite edges of the casing projecting radially outwardly in confronting relation to one another to be sealed into a longitudinally extending joint, a joint sealer having a pair of opposed downstream sealing rolls and a pair of opposed drive conveyors upstream of the sealing rolls, the drive conveyors of the joint sealer overlying the first conveyor for clamping and driving the projecting casing edges from the forming collar to the sealing rolls, the drive conveyors of the joint sealer cooperating with the underlying first conveyor to guide and advance the casing along its path of movement, a second power operated conveyor overlying the first conveyor in parallel relation thereto downstream of the joint sealer, the second conveyor cooperating with the first conveyor for applying a tractive force to sealed duct emerging from the joint sealer to draw the sealed duct along its path of movement, a frame, the first and second conveyors being endless belt conveyors with the second belt conveyor mounted on the frame for selectively adjusting its height relative to the first conveyor, the joint sealer being interconnected to the second belt conveyor for adjustable height positioning relative to the underlying first conveyor simultaneously with adjustment of the second conveyor for duct of different diameter sizes, the first and second conveyors having a common power operated drive, the joint sealer being mounted on a support platform interconnected to the second conveyor, the support platform being independently adjustable relative to the second conveyor to provide auxiliary height adjustment to the joint sealer, and a cutting unit downstream of the second conveyor for cutting sealed duct into predetermined lengths.

13. A machine for making tubular duct having a supporting core surrounded by insulation and an outer casing wrapped about the insulation, the machine comprising a first power operated conveyor for supporting and conveying duct along a linear path of movement, a sheet forming collar upstream of the first conveyor for receiving tubular core and shaping sheets of indefinite lengths of casing and insulation into tubular form about the core with opposite edges of the casing projecting radially outwardly in confronting relation to one another to be sealed into a longitudinally extending joint, a joint sealer having a pair of opposed downstream sealing rolls and a pair of opposed drive conveyors upstream of the sealing rolls, the drive conveyors of the joint sealer overlying the first conveyor for clamping and driving the projecting casing edges from the forming collar to the sealing rolls, the drive conveyors of the joint sealer cooperating with the underlying first conveyor to guide and advance the casing along its path of movement, a second power operated conveyor overlying the first conveyor in parallel relation thereto downstream of the joint sealer, the second conveyor cooperating with the first conveyor for applyiing a tractive force to sealed duct emerging from the joint sealer to draw the sealed duct along its path of movement, a cutting unit downstream of the second conveyor for cutting sealed duct into predetermined lengths, the cutting unit having a carriage and a selectively operable saw mounted on the carriage, the carriage supported for sliding movement across the path of movement of the duct between a starting position and an extended position for cutting sealed duct into predetermined lengths upon its emerging from the second conveyor, a sensing device for producing a signal upon feeding a specified length of sealed duct past the cutting unit, and a selectively operable common drive for power operating the first and second conveyors and the joint sealer, the common drive and the saw being operable responsive to a signal from the sensing device for simultaneously de-energizing one of the common drive and saw elements and energizing the other thereof in alternating sequence and in timed relation to passage of specified lengths of sealed duct past the cutting unit for cutting sealed duct into predetermined lengths.

14. The machine of claim 13 wherein the core is fed onto the insulation in predetermined lengths upstream of the forming collar, and wherein the sensing device is presettable to render the common drive inoperable and to simultaneously operate the saw for cutting the sealed duct casing and insulation between the lengths of core.

* * * * *

UNITED STATES PATENT OFFICE
CERTIFICATE OF CORRECTION

PATENT NO. : 3,950,213
DATED : April 13, 1976
INVENTOR(S) : WILLIAM E. REJESKI & NORMAN J. PERUSSE It is certified that error appears in the above-identified patent and that said Letters Patent are hereby corrected as shown below:

Column 3, line 31, delete "5AA" and substitute therefor --54A of tape 54--.

Column 8, line 58, delete "confrontiing" and substitute therefor --confronting--.

Column 11, line 21, delete "applyiing" and substitute therefor --applying--.

Signed and Sealed this

Twenty-fourth Day of August 1976

[SEAL]

Attest:

RUTH C. MASON
Attesting Officer

C. MARSHALL DANN
Commissioner of Patents and Trademarks